(No Model.)

J. CUNNINGHAM.
CULINARY VESSEL.

No. 504,022. Patented Aug. 29, 1893.

Witnesses
Inventor
James Cunningham
By

UNITED STATES PATENT OFFICE.

JAMES CUNNINGHAM, OF DUSHORE, PENNSYLVANIA.

CULINARY VESSEL.

SPECIFICATION forming part of Letters Patent No. 504,022, dated August 29, 1893.

Application filed September 2, 1892. Serial No. 444,850. (No model.)

*To all whom it may concern:*

Be it known that I, JAMES CUNNINGHAM, a citizen of the United States, residing at Dushore, in the county of Sullivan and State of Pennsylvania, have invented certain new and useful Improvements in Culinary Vessels; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to culinary vessels, and has for its object to construct the vessel so that the heat will come in contact not only with the bottom of the vessel but also with all portions of the sides of the vessel whereby the contents are more quickly and uniformly heated, there being also provision made for the escape of the steam or fumes from the vessel directly into the combustion chamber over which the vessel is placed, the details of such construction being hereinafter particularly described and the advantages thereof set forth and then specifically defined by the claim; reference being had to the accompanying drawings forming a part hereof and in which—

Figure 1:
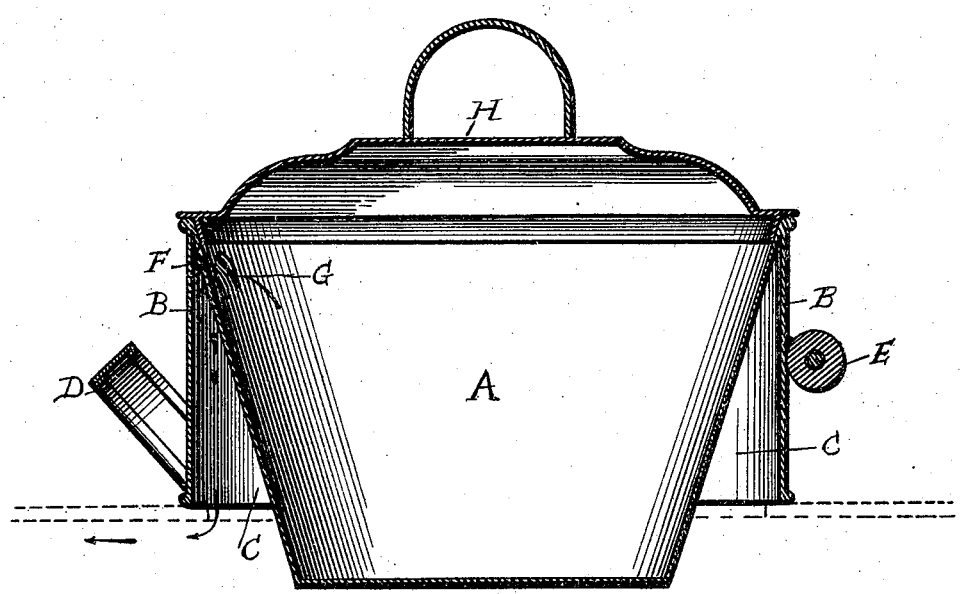
Figure 2:
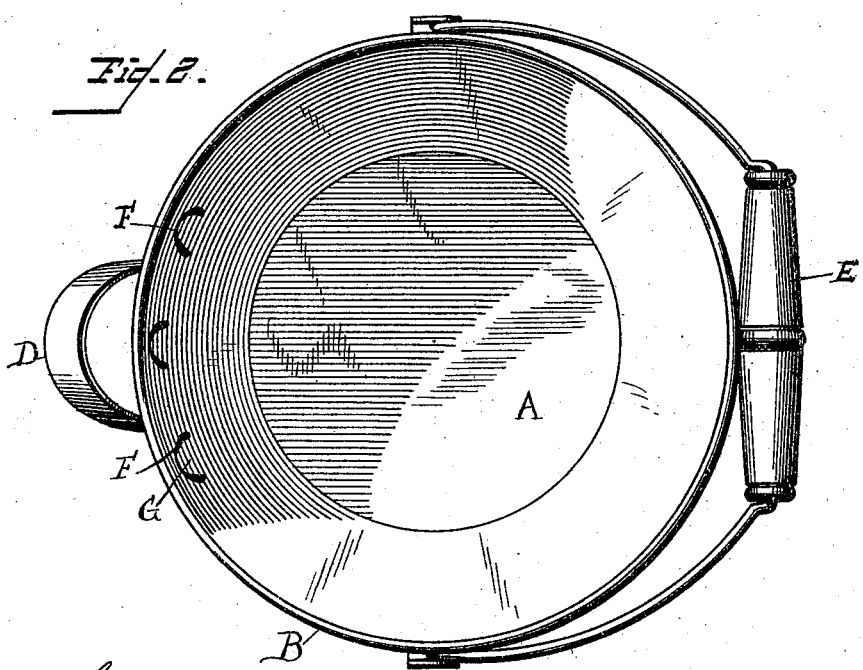

Figure 1 is a vertical section through the utensil, there being illustrated by dotted lines the top of the combustion chamber on which the utensil rests. Fig. 2 is a top plan of the utensil with the cover removed.

In the drawings the letter A designates the upper chamber of the vessel having preferably its walls inclining inwardly from the top to the bottom and surrounded by a jacket or shell B the lower edge of which terminates above the bottom of the inner vessel and the wall of which is preferably upright or vertical so as to set out from the wall of the inner vessel and form a chamber C around said inner vessel which has its greatest diameter at the base and tapers from that point to the top. This outside jacket or casing is made integral with the same vessel and preferably from the same piece of metal so that it forms a permanent part thereof and in order that it may at all times constitute a protecting shell for the inner vessel and prevent the separation of the two in handling the utensil, and so as to permit the vessel to be tilted for discharging its contents in whole or in part without the necessity of lifting the vessel from the stove and without the liability of the inner vessel sliding out of its casing when tilted as would be the case were the construction other than that described. In order to tilt the vessel a handle is provided at the side of the jacket or casing, and to facilitate lifting the vessel and its casing and moving the same about, a bail E is provided as illustrated.

It will be observed that the lower edge of the casing or jacket B terminates some distance above the bottom of the inner chamber A so that when the vessel is placed over the combustion chamber, the bottom of the inner chamber, will extend down into the combustion chamber while the shell will rest upon the top of that chamber and suspend the inner chamber over the fire so that the heat may not only be against the bottom of the inner vessel but also against its sides and entirely around the same, the advantage of which is apparent.

In order that the steam and fumes from the substance being cooked may not pass into the room but be caused to pass into the combustion chamber, and there be consumed, I form in the wall of the inner chamber near its top one or more apertures F so that a communication will be established between the interior of the inner chamber and the chamber C surrounding the chamber from whence they may pass down into the combustion chamber. It will be observed that there is not a small narrow channel through which the fumes and steam are intended to pass to the combustion chamber but a large chamber entirely surrounding the inner chamber so that the heat ascending upward through said extended chamber will to a greater or less extent pass up into said chamber and around the same toward the point where the apertures F are formed and then downward inasmuch as the steam and fumes finding their exit at that point create a downward draft or current and tend to draw the heated air in that direction whereby a circulation is established and as a result the heat is carried entirely around the inner chamber and then joining in the down draft where the steam and fumes escape a stronger current is created at that point and the fumes more quickly carried off and any possibility of their being forced back into the inner chamber and out into the room avoided. In order to form a guard or shield to said apertures I prefer to press outward the metal G where the apertures are formed so that the shields thus formed will prevent any sparks or small foreign substance or matter rising and passing through the apertures into the inner chamber, it being apparent that said shields will deflect such foreign matter downward and prevent it passing into the inner chamber.

The cover for the utensil is indicated by the letter H.

The utensil is inexpensive to construct and very efficient in service and possesses the advantages assigned to it as well as others that will be apparent to the skilled.

Having described my invention and set forth its merits, what I claim is—

The culinary vessel comprising the inner vessel provided with an outside casing arranged to form a space entirely around the inner chamber and an exit aperture formed in the upper portion of the wall of the inside vessel to establish a communication between the interior of the inside vessel and the entire chamber surrounding said vessel and a lip extending outwardly and upwardly from below said exit aperture to form a shield, substantially as and for the purposes set forth.

In testimony whereof I affix my signature in presence of two witnesses.

JAMES CUNNINGHAM.

Witnesses:
RUSH J. THOMSON,
F. V. THOMSON.